United States Patent [19]
Kaneda et al.

[11] Patent Number: 5,136,467
[45] Date of Patent: Aug. 4, 1992

[54] IC CARD ADAPTER WITH CARD RECEPTORS IN THE SIDES OF THE HOUSING

[75] Inventors: Takashi Kaneda, Chiba, Japan; Thomas Villwock, Niedernhausen, Fed. Rep. of Germany

[73] Assignees: MIPS Co., Ltd., Tokyo; Dataline Technologies GmbH, Frankfurt/Niedernhausen, both of Fed. Rep. of Germany

[21] Appl. No.: 698,795

[22] Filed: May 13, 1991

Related U.S. Application Data

[63] Continuation of Ser. No. 392,451, Aug. 11, 1989, Pat. No. 5,036,429.

[30] Foreign Application Priority Data

Feb. 27, 1989 [JP]  Japan ................................... 1-20199

[51] Int. Cl.⁵ ............................................. H05K 7/00
[52] U.S. Cl. .................................................... 361/392
[58] Field of Search ............... 361/395, 396, 412, 413, 361/415, 392, 393, 394, 399; 235/441, 492, 493; 273/85 G, 148 A, 148 B, 435; 439/62, 65, 74

[56] References Cited

U.S. PATENT DOCUMENTS

| 3,573,558 | 4/1971 | Babcock | 439/61 |
| 4,285,063 | 8/1981 | Zbinden | 375/106 |
| 4,401,351 | 8/1983 | Record | 361/395 |
| 4,516,777 | 5/1985 | Nikora | 273/148 A |
| 4,821,146 | 4/1989 | Behrens et al. | 361/395 |
| 4,840,570 | 6/1989 | Mann, Jr. et al. | 361/413 |

FOREIGN PATENT DOCUMENTS 0431723  6/1991  European Pat. Off. ............. 273/435

Primary Examiner—Leo P. Picard
Assistant Examiner—D. Sparks

[57] ABSTRACT

An IC card adapter to be connected to an electronic device such as electronic computers includes an IC card receptor portion for removably storing a plurality of IC cards, a connector portion to be connected to the electronic device and a device for selectively connecting one or more of the IC cards to the computer.

40 Claims, 2 Drawing Sheets

IC CARD ADAPTER WITH CARD RECEPTORS IN THE SIDES OF THE HOUSING

This application is a continuation of copending application Ser. No. 07/392,451, filed on Aug. 11. 1989, the entire contents of which are hereby incorporated by reference, now U.S. Pat. No. 5,038,429.

BACKGROUND OF THE INVENTION

The present invention relates to an IC card adapter for use in selectively adding to an electronic device such as electronic computers or electronic printers at least a new function stored in an IC card.

There is a case where a function or functions which are not included originally in such electronic device are to be added thereto or a certain original function thereof is to be modified or replaced by another. In order to make it possible to respond to such a requirement, it is highly desired to provide an adapter capable of selectively a incorporating a desired one of a plurality of IC cards each having integrated circuit devices such as CPU, ROM and/or RAM etc, and a desired program stored therein.

SUMMARY OF THE INVENTION

The present invention intends to provide an IC card adapter capable of removably incorporating, in an electronic device such as computers, word processors or printers, at least one IC car having its own program to thereby make it possible to operate the electronic device on a basis of the program which is not included originally in the electronic device.

According to the first embodiment of the present invention, an IC card adapter includes a housing, an IC card receptor portion provided in or on the housing for removably receiving a plurality of individual IC cards and a connector portion provided in the front portion of the housing and adapted to electrically and mechanically connect the IC card adapter to the electronic device.

According to a second embodiment of the present invention, an IC card adapter includes, in addition, means for selectively incorporating a desired one or more of the IC cards in the receptor portion thereof in the electronic device.

The means for selectively incorporating the desired IC card in the electronic device comprises means responsive to a control signal from the electronic device or from a manually operatable switch circuit. In the latter case, an external selection of a desired IC card becomes possible.

It is possible to provide an indicator on the housing to indicate the IC card selected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAIL DESCRIPTION OF THE PREFERRED EMBODIMENTS

Figure 1:
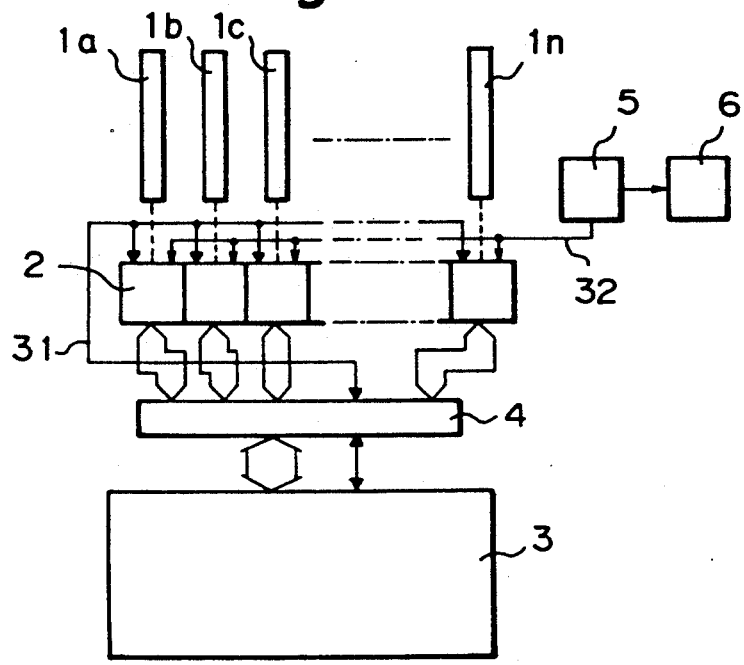
FIG. 1 shows schematically an arrangement of an IC card adapter according to the present invention with respect to an electronic device.
Figure 2:
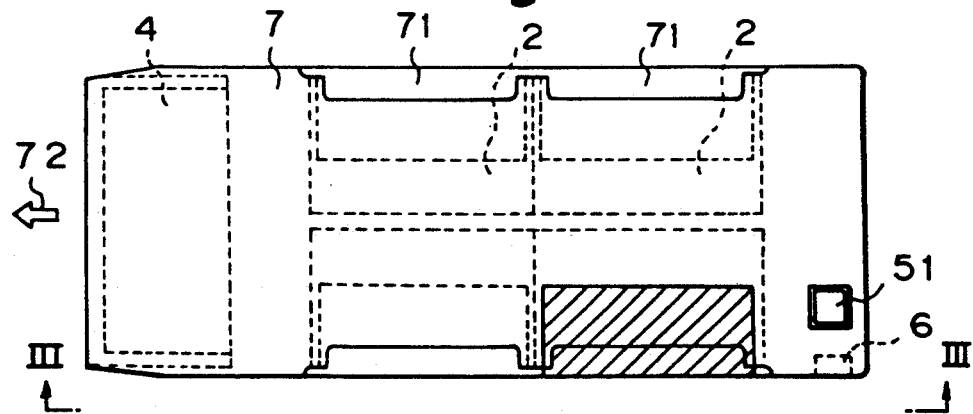
FIG. 2 is a plan view of a lateral type IC card adapter.
Figure 3:
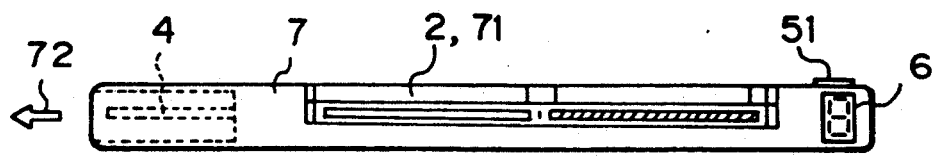
FIG. 3 is a side view of the IC card adapter at a line III—III in FIG. 2.

In FIGS. 1 to 3 an embodiment of an IC card adapter according to the present invention comprises a housing 7 including a card receptor 2 of lateral type for removably receiving a plurality of individual IC cards $1a$, $1b$,..., $1n$ and a connector portion 4 for connecting electrically and mechanically the card receptor 2 to an electronic device 3 such as computers, word processors or electronic printers The connector portion 4 may respond to a control signal 31 from the electronic device 3 Which may be given according to a program incorporated therein to select desired one or more of the IC cards $1a$, $1b$...$1n$.

In order to allow an external selection of desired one or more of the IC cards to be connected to the electronic device 3, a switch circuit 5 is provided in the housing 7. The switch circuit 5 is adapted to produce an external control signal 32 upon which an external IC card selection becomes possible. The switch circuit 5 includes a manual switch 51 and the external control signal is produced by manually operating the switch 51.

An indicator 6 is associated with the switch circuit 5 to indicate a selected IC card.

In FIGS. 2 and 3, the housing 7 has a plurality of slots 71 in which the card receptor 2 is provided, respectively, to removably receive the individual IC card $1a$, $1b$... or $1n$, horizontally.

In FIGS. 2 and 3, a hatched portion shows a slot 71 which has received a horizontally disposed IC card.

The manual switch 51 is provided in the rear corner of the housing 7. The connector portion 4 is formed in the front end portion of the housing 7, which, when the adapter is moved in the arrow direction 72, fits electrically and mechanically in a connector portion (not shown) of the electronic device which is connected to electronic circuits of the electronic device for expanding function of the electronic device when it is an electronic computer, or for a font expansion/format setting function when it is a word processor.

The indicator 6 which may be a 7-segment LED is provided in a side surface of the housing, so that an IC card selected upon the control signal 31 from the electronic device 3 or from the manual switch 51 through the switch circuit 5 can be displayed suitably thereon.

Figure 4:
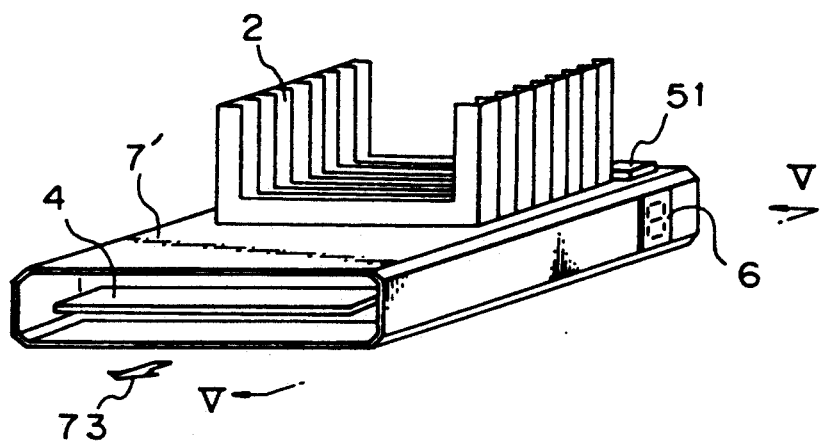
FIG. 4 is a perspective view of a vertical type IC card adapter.
Figure 5:
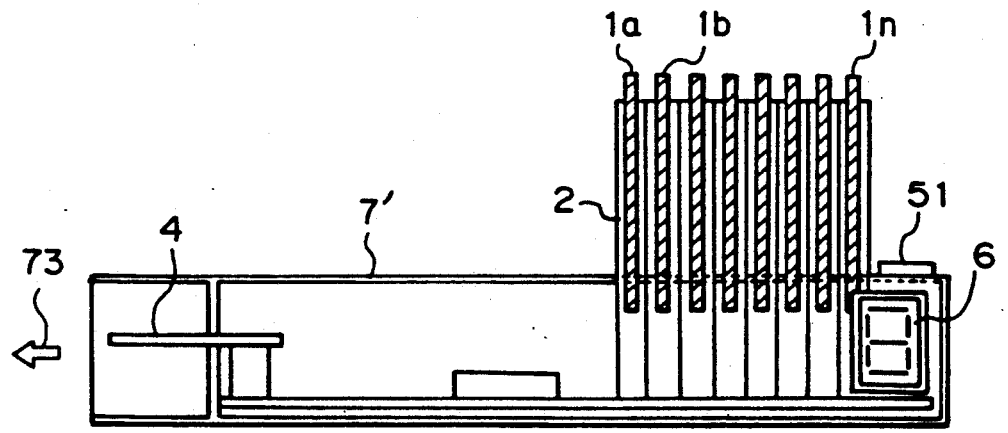
FIG. 5 is a cross section taken along a line V—V in FIG. 4, with the IC card receptor filled with IC cards.

In FIGS. 4 and 5 which are a plan view and a side view of another embodiment of the present invention, respectively, an IC adapter includes a housing $7'$ on which a plurality of vertical IC card receptors 2 are arranged side by side in which respective IC cards $1a$, $1b$..., $1n$ are to be inserted vertically. A manual switch 51 and a display 6 are provided on the rear portion of the housing $7'$ similarly to the embodiment shown in FIGS. 2 and 3, and a connector portion 4 is also provided in the front portion of the housing $7'$. Functions of these elements are the same as those shown in FIGS. 2 and 3, respectively.

The IC card adapter is fitted in a connector portion (not shown) of the electronic device 3 by inserting it into the connector portion of the device as shown by the arrow 73. A selection of a desired IC card is performed by the control signal 31 to be supplied from the electronic device internally or by the signal 32 to be produced by operating the manual switch 51 as in the case of the embodiment shown in FIGS. 2 and 3.

As mentioned above, according to the present invention, by mounting on the electronic device, the present IC card adapter mounted the IC card thereon, it is possible to easily exchange an IC card to be incorporated in the electronic device, to thereby change a program of the latter according to demand.

Further, since it is possible to arrange a plurality of different IC cards, it is possible to increase or replace the CPU(s), ROM(s) and/or RAM(s), resulting in a multi-function electronic device. Further, it may be possible to incorporate more than one IC card in the electronic device, simultaneously.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An IC card adapter connectable to an electronic device, said adapter holding a plurality of individual IC cards and comprising a housing having a card receptor portion for simultaneously receiving the plurality of individual IC cards, the individual IC cards being readily detachable from the card receptor portion, and the adapter further comprising a connector portion provided in the front portion of the housing, said connector portion electrically and mechanically connecting the adapter to an electronic device, the adapter further comprising a plurality of slots defined in sides of the housing, the card receptor portion being provided in the slots and the individual IC cards being inserted in individual slots, some of the sides of the housing having the slots being opposed to one another.

2. The IC card adapter as recited in claim 1, further comprising means for selecting one or more of the IC cards, said means including the connector portion which is responsive to a control signal from an electronic device.

3. The IC card adapter as recited in claim 2, wherein the means for selecting further comprises a switch circuit provided in said housing for manual IC card selection.

4. The IC card adapter as recited in claim 3, wherein the switch circuit includes a switch provided on the housing, the switch being at an end of the housing generally opposite to the front portion at which the connector portion connects the adapter to an electronic device.

5. The IC card adapter as recited in claim 1, wherein the connector portion extends from the front portion of the housing through the housing to each of the individual IC cards.

6. The IC card adapter as recited in claim 5, wherein an end of the connector portion is exposed at the front portion of the housing and wherein the housing forms a recess at the front portion thereof which surrounds an exposed part of the connector portion.

7. The IC card adapter as recited in claim 1, wherein the card receptor portion receives at least some of the IC cards in a direction generally perpendicular to a direction in which an electronic device receives the connector portion.

8. The IC card adapter as recited in claim 1, wherein the front portion of the housing in which the connector portion is provided comprises a side of the housing which is generally perpendicular to said some of the sides having the slots defined therein.

9. The IC card adapter as recited in claim 1, wherein the housing has a generally rectangular shape.

10. The IC card adapter as recited in claim 1, wherein some of the individual IC cards are insertable into and removable from the card receptor portion in generally opposed directions, at least front ends of each IC card being operatively connected in the card receptor portion to the adapter while rear ends of each IC card are free of electrical connections.

11. The IC card adapter as recited in claim 1, wherein the connector portion has a generally flat portion exposed outside the housing at the front portion thereof, the flat portion lying in a first plane and each of the individual IC cards being generally flat, each IC card when received in the card receptor portion lying in a plane which is substantially parallel to the first plane.

12. The IC card adapter as recited in claim 11, wherein each IC card received in the card receptor portion generally lies in the same plane such that the IC cards received in the card receptor portion are generally parallel.

13. The IC card adapter as recited in claim 1, wherein the connector portion only extends from the front portion of the housing such that the adapter is mechanically connectable to an electronic device only at a front side thereof.

14. An IC card adapter connectable to an electronic device, said adapter holding a plurality of individual IC cards and comprising a housing having a card receptor portion for simultaneously receiving the plurality of individual IC cards, the individual IC cards being readily detachable from the card receptor portion, and the adapter further comprising a connector portion provided in the front portion of the housing, said connector portion electrically and mechanically connecting the adapter to an electronic device, some of the individual IC cards being insertable into and removable from the card receptor portion in generally opposed directions, at least front ends of each IC card being operatively connected in the card receptor portion to the adapter while rear ends of each IC card are free of electrical connections.

15. The IC card adapter as recited in claim 14, further comprising means for selecting one or more of the IC cards, said means including the connector portion which is responsive to a control signal from an electronic device.

16. The IC card adapter as recited in claim 15, wherein the means for selecting further comprises a switch circuit provided in said housing for manual IC card selection.

17. The IC card adapter as recited in claim 16, wherein the switch circuit includes a switch provided on the housing, the switch being at an end of the housing generally opposite to the front portion at which the connector portion connects the adapter to an electronic device.

18. The IC card adapter as recited in claim 14, wherein the connector portion extends form the front portion of the housing through the housing to each of the individual IC cards.

19. The IC card adapter as recited in claim 18, wherein an end of the connector portion is exposed at the front portion of the housing and wherein the housing forms a recess at the front portion thereof which surrounds an exposed part of the connector portion.

20. The IC card adapter as recited in claim 14, wherein the card receptor portion receives at least some of the IC cards in a direction generally perpendicular to a direction in which an electronic device receives the connector portion.

21. The IC card adapter as recited in claim 14, wherein the connector portion has a generally flat portion exposed outside the housing at the front portion thereof, the flat portion lying in a first plane and each of the individual IC cards being generally flat, each IC card when received in the card receptor portion lying in a plane which is substantially parallel to the first plane.

22. The IC card adapter as recited in claim 21, wherein each IC card received in the card receptor portion generally lies in the same plane such that the IC cards received in the card receptor portion are generally parallel.

23. The IC card adapter as recited in claim 14, wherein the connector portion only extends from the front portion of the housing such that the adapter is mechanically connectable to an electronic device only at a front side thereof.

24. An IC card adapter connectable to an electronic device, said adapter holding a plurality of individual IC cards and comprising a housing having a card receptor portion for simultaneously receiving the plurality of individual IC cards, the individual IC cards being readily detachable from the card receptor portion, and the adapter further comprising a connector portion provided in the front portion of the housing, said connector portion electrically and mechanically connecting the adapter to an electronic device, the card receptor portion receiving at least some of the IC cards in a direction generally perpendicular to a direction in which an electronic device receives the connector portion, the connector portion having a generally flat portion exposed outside the housing at the front portion thereof, the flat portion lying in a first plane and each of the individual IC cards being generally flat, each IC card when received in the card receptor portion lying in a plane which is substantially parallel to the first plane.

25. The IC card adapter as recited in claim 24, further comprising means for selecting one or more of the IC cards, said mans including the connector portion which is responsive to a control signal from an electronic device.

26. The IC card adapter as recited in claim 25, wherein the means for selecting further comprises a switch circuit provided in said housing for manual IC card selection.

27. The IC card adapter as recited in claim 26, wherein the switch circuit includes a switch provided on the housing, the switch being at an end of the housing generally opposite to the front portion at which the connector portion connects the adapter to an electronic device.

28. The IC card adapter as recited in claim 24, wherein each IC card received in the card receptor portion generally lies in the same plane such that the IC cards received in the card receptor portion are generally parallel.

29. An IC card adapter connectable to an electronic device, said adapter holding a plurality of individual IC cards and comprising a housing having a card receptor portion for simultaneously receiving the plurality of individual IC cards, the individual IC cards being readily detachable from the card receptor portion, and the adapter further comprising a connector portion provided in the front portion of the housing, said connector portion electrically and mechanically connecting the adapter to an electronic device, the adapter further comprises means for selecting one or more of the IC cards, said means including the connector portion which is responsive to a control signal from an electronic device.

30. The IC card adapter as recited in claim 29, wherein the means for selecting further comprises a switch circuit provided in said housing for manual IC card selection.

31. The IC card adapter as recited in claim 30, wherein the switch circuit includes a switch provided on the housing, the switch being at an end of the housing generally opposite to the front portion at which the connector portion connects the adapter to an electronic device.

32. The IC card adapter as recited in claim 29, wherein the connector portion extends from the front portion of the housing through the housing to each of the individual IC cards.

33. The IC card adapter as recited in claim 32, wherein an end of the connector portion is exposed at the front portion of the housing and wherein the housing forms a recess at the front portion thereof which surrounds an exposed part of the connector portion.

34. The IC card adapter as recited in claim 29, wherein the card receptor portion receives at least some of the IC cards in a direction generally perpendicular to a direction in which an electronic device receives the connector portion.

35. The IC card adapter as recited in claim 29, wherein the card receptor portion is provided on a top surface of the housing.

36. The IC card adapter as recited in claim 35, wherein the front portion of the housing in which the connector portion is provided comprises a side of the housing which is generally perpendicular to the top surface of the housing having the card receptor portion.

37. The IC card adapter as recited in claim 29, wherein some of the individual IC cards are insertable into and removable from the card receptor portion in generally opposed directions, at least front ends of each IC card being operatively connected in the card receptor portion to the adapter while rear ends of each IC card are free of electrical connections.

38. The IC card adapter as recited in claim 29, wherein the connector portion has a generally flat portion exposed outside the housing at the front portion thereof, the flat portion lying in a first plane and each of the individual IC cards being generally flat, each IC card when received in the card receptor portion lying in a plane which is substantially parallel to the first plane.

39. The IC card adapter as recited in claim 28, wherein each IC card received in the card receptor portion generally lies in the same plane such that the IC cards received in the card receptor portion are generally parallel.

40. The IC card adapter as recited in claim 29, wherein the connector portion only extends from the front portion of the housing such that the adapter is mechanically connectable to an electronic device only at a front side thereof.

* * * * *

UNITED STATES PATENT AND TRADEMARK OFFICE
CERTIFICATE OF CORRECTION

PATENT NO. : 5,136,467
DATED      : August 4, 1992
INVENTOR(S) : Takashi Kaneda and Thomas Villwock It is certified that error appears in the above-identified patent and that said Letters Patent is hereby corrected as shown below:

On title page, item [63], Related U.S. Application Data, change "392,451" to --392,454--

Signed and Sealed this

Fourteenth Day of September, 1993

Attest:

BRUCE LEHMAN

*Attesting Officer*  *Commissioner of Patents and Trademarks*